United States Patent
Reiling et al.

(10) Patent No.: US 12,466,212 B2
(45) Date of Patent: Nov. 11, 2025

(54) METHOD FOR PRODUCING A MOTOR VEHICLE RIM MADE OF ALUMINUM OR AN ALUMINUM ALLOY FOR A WHEEL OF A MOTOR VEHICLE AND CORRESPONDING MOTOR VEHICLE RIM

(71) Applicant: AUDI AG, Ingolstadt (DE)

(72) Inventors: Jaan Mattes Reiling, Sassenberg (DE); Jan Gaugler, Neckarmühlbach (DE); Marc Hummel, Güglingen (DE)

(73) Assignee: AUDI AG, Ingolstadt (DE)

( * ) Notice: Subject to any disclaimer, the term of this patent is extended or adjusted under 35 U.S.C. 154(b) by 673 days.

(21) Appl. No.: 17/787,735

(22) PCT Filed: Nov. 18, 2020

(86) PCT No.: PCT/EP2020/082531
§ 371 (c)(1),
(2) Date: Jun. 21, 2022

(87) PCT Pub. No.: WO2021/144052
PCT Pub. Date: Jul. 22, 2021

(65) Prior Publication Data
US 2023/0074550 A1    Mar. 9, 2023

(30) Foreign Application Priority Data

Jan. 14, 2020  (DE) .......................... 102020100693.4

(51) Int. Cl.
*B60B 3/06*    (2006.01)
*B22D 18/06*   (2006.01)
(Continued)

(52) U.S. Cl.
CPC ................ *B60B 3/06* (2013.01); *B22D 18/06* (2013.01); *B60B 3/02* (2013.01); *B60B 3/10* (2013.01);
(Continued)

(58) Field of Classification Search
CPC .... B60B 3/02; B60B 3/06; B60B 3/10; B60B 19/10; B22D 18/06
See application file for complete search history.

(56) References Cited

U.S. PATENT DOCUMENTS

| | | | |
|---|---|---|---|
| 5,647,426 A | 7/1997 | Prieto et al. | |
| 8,651,584 B2 | 2/2014 | Hino | |

(Continued)

FOREIGN PATENT DOCUMENTS

| | | | |
|---|---|---|---|
| CN | 1914051 A | 2/2007 | |
| CN | 1997525 A | * 7/2007 | ............. B21D 53/26 |

(Continued)

OTHER PUBLICATIONS

Office Action issued on Sep. 18, 2023, in corresponding German Patent Application No. 102020100693.4, 12 pages.

(Continued)

*Primary Examiner* — Kip T Kotter
(74) *Attorney, Agent, or Firm* — Maier & Maier, PLLC (57) ABSTRACT

A method for producing an automobile rim made of aluminum or an aluminum alloy for a wheel of an automobile, the automobile rim having a rim well delimited on opposite sides by an outer flange and an inner flange, a hub with a center recess and a bolt hole circle as well as a rim center connecting the rim well and the hub with one another. The automobile rim is produced in one piece and continuously in a casting mold by die casting of a casting material. The automobile rim is formed during the die casting with at least one air conveying element for conveying air in the axial direction with respect to a longitudinal center axis of the automobile rim relative to an imaginary plane perpendicular to the longitudinal center axis and/or at least one surface enlargement element extending in the circumferential direction along a circular line.

20 Claims, 4 Drawing Sheets

(51) Int. Cl.
  *B60B 3/02* (2006.01)
  *B60B 3/10* (2006.01)
  *B60B 19/10* (2006.01)
(52) U.S. Cl.
  CPC ........ *B60B 19/10* (2013.01); *B60B 2310/202* (2013.01); *B60B 2360/104* (2013.01)

(56) References Cited

U.S. PATENT DOCUMENTS

| | | |
|---|---|---|
| 2009/0236902 A1 | 9/2009 | Zibkoff |
| 2011/0233992 A1 | 9/2011 | Hino |
| 2014/0191565 A1 | 7/2014 | Gebeau |
| 2016/0361946 A1 | 12/2016 | Imai et al. |

FOREIGN PATENT DOCUMENTS

| | | | |
|---|---|---|---|
| CN | 105538997 A | * | 5/2016 |
| CN | 106687302 A | | 5/2017 |
| DE | 4138558 A1 | | 5/1993 |
| DE | 4027355 C2 | | 1/1995 |
| DE | 20320840 U1 | | 3/2005 |
| DE | 102013002632 A1 | | 8/2013 |
| DE | 202014100377 U1 | | 3/2014 |
| DE | 102013208226 A1 | | 11/2014 |
| DE | 102016106256 B3 | | 3/2017 |
| EP | 0301472 B1 | | 4/1991 |
| EP | 1261445 B1 | | 11/2003 |
| EP | 2848333 A1 | | 3/2015 |
| GB | 2202196 A | | 9/1988 |
| GB | 2249063 A | | 4/1992 |
| WO | 2020156920 A1 | | 8/2020 |

OTHER PUBLICATIONS

Office Action issued on Nov. 25, 2024, in corresponding Chinese Application No. 202080093149.2, 18 pages.

International Search Report, issued on Jan. 28, 2021, with accompanying Written Opinion, in corresponding International Patent Application: PCT/EP2020/082531; 23 pages.

German Examination Report, issued on Sep. 23, 2020, in corresponding German Patent Application No. 10 2020 100 699.3; 20 pages.

International Preliminary Report on Patentability and Translation of Written Opinion, issued on Jul. 19, 2022, in corresponding International Patent Application: PCT/EP2020/082531; 16 pages.

* cited by examiner

METHOD FOR PRODUCING A MOTOR VEHICLE RIM MADE OF ALUMINUM OR AN ALUMINUM ALLOY FOR A WHEEL OF A MOTOR VEHICLE AND CORRESPONDING MOTOR VEHICLE RIM

FIELD

The invention relates to a method of producing an automobile rim from aluminum or an aluminum alloy for a wheel of an automobile, the automobile rim having a rim well delimited on opposite sides by an outer flange and an inner flange, a hub with a center recess and a bolt hole circle, and a rim center connecting the rim well and the hub with one another, in particular engaging eccentrically on the rim well in longitudinal section. The invention further relates to an automobile rim.

BACKGROUND

For example, EP 0 301 472 B1 is known from the prior art. The document describes a production method for cast light alloy wheels for passenger cars, in which a near-eutectic refined AlSi alloy is used which—in addition to Al—contains weight fractions of 9.5% to 12.5% silicon and alloying constituents such as a maximum of 0.2% iron, a maximum of 0.05% manganese, a maximum of 0.1% titanium, a maximum of 0.03% copper, a maximum of 0.05% zinc and a maximum of 0.05% each and a maximum of 0.15% in total of other impurities, and wherein the wheels are removed from the casting mold after solidification and cooled. It is provided here that the alloy contains at least 0.05 to at most 0.15% by weight of magnesium and that the wheels are quenched in water at a temperature—measured at their surface—of at least 380° C. on inner areas or areas with mass concentrations, such as the hub and the disc of the wheels, immediately upon removal from the casting mold.

Furthermore, DE 20 2014 100 377 U1 describes a vehicle wheel having a wheel body and a plurality of rim blades coupled to at least one side surface of the wheel body, each of the rim blades having an airflow guiding portion and an airflow assisting portion, the airflow guiding portion and the airflow assisting portion being disposed in front and rear sides on the rim blade.

DE 40 27 355 C2 also shows a double disc assembly for light alloy automobile wheels, comprising: first and second wheel discs formed separately from each other and detachably secured to each other at their hubs by means of a plurality of first screw clamping means and at their peripheral edges by means of a plurality of second screw clamping means, and rotatable as a unitary double wheel disc together with the wheel rim provided thereon; and ventilation holes formed in the corresponding intermediate portions between the hub and the peripheral edge of the two wheel discs, wherein the ventilation holes of the second wheel disc differ in size, shape and distribution from the ventilation holes of the first wheel disc, and wherein the intermediate portions and the wheel axle form a triangular configuration in cross section.

SUMMARY

It is the object of the invention to propose a method for producing an automobile rim made of aluminum or an aluminum alloy for a wheel of an automobile, which has advantages over known methods of this kind, in particular enables particularly rapid and cost-effective production of the automobile rim with particularly filigree structures and also ensures excellent heat dissipation from the automobile rim.

The object is achieved by a method of producing an automobile rim. It is provided here that the automobile rim is produced in one piece and continuously in a casting mold by die casting of a casting material, wherein the automobile rim is formed during the die casting with at least one air conveying element for conveying air in the axial direction with respect to a longitudinal center axis of the automobile rim relative to an imaginary plane perpendicular to the longitudinal center axis and/or at least one surface enlargement element extending in the circumferential direction along a circular line.

The automobile rim is usually a component of the automobile' wheel, wherein several wheels are arranged on the automobile, each of which has such an automobile rim. The automobile is in the form of an automobile and in this respect has more than two wheels, in particular exactly four wheels. The automobile rim is explicitly provided and designed for use in such an automobile designed as an automobile. The automobile rim is therefore not a generic automobile rim, but is intended for use on the automobile and is designed accordingly.

The essential components of the automobile rim are the rim well, the rim center and the hub. The rim well and the hub are connected with one another via the rim center, at least the rim well, the rim center and the hub being formed in one piece and as a single material. For this purpose, the rim well, the rim center and the hub are formed together simultaneously, namely during a single producing step. It is therefore not intended to produce the rim well, the rim center and the hub separately from one another and to subsequently fasten them with one another. Rather, they are produced together, namely by die casting the casting material in the mold.

The automobile rim has a longitudinal center axis equal in particular to a longitudinal center axis of the hub and preferably coincides or at least almost coincides with a later axis of rotation of the wheel. Viewed in the axial direction with respect to this longitudinal center axis, the rim well is delimited on opposite sides by the outer flange and the inner flange. In this respect, the outer flange and the inner flange are located on opposite sides of the rim well and enclose a tire receiving area of the automobile rim between them as viewed in longitudinal section with respect to the longitudinal center axis. The tire receiving area serves to receive a tire which, together with the automobile rim, forms the wheel. The tire receiving area is bounded in the radial direction inwardly by the rim well and in the axial direction on opposite sides by the outer flange and the inner flange.

The entire automobile rim is particularly preferably bounded in the axial direction or, as viewed in longitudinal section, in a first direction by the outer flange and in a second direction by the inner flange, so that the outer flange and the inner flange define an overall extension of the automobile rim in the axial direction, corresponding to a width of the automobile rim. When the wheel is mounted on the automobile, the wheel is rotatably supported on a wheel support via a wheel bearing. After mounting of the wheel on the automobile, the outer flange is present on a side of the automobile rim facing away from the wheel carrier and the inner flange is present on a side of the automobile rim facing the wheel carrier.

The outer flange and the inner flange are in the form of a radial projection starting from the rim well and extending radially outward from the rim well, again with respect to the longitudinal center axis of the automobile rim. Of course, the outer flange and the inner flange are also formed in one piece and of the same material as the rest of the automobile rim, in particular the rim well, the rim center and the hub. In this respect, they are formed at the same time as these during the die casting process.

The hub has the center recess and the bolt hole circle. The center recess is a recess located in the center for receiving a wheel hub of the automobile, to which the wheel is attached during assembly on the automobile. The wheel hub is rotatably mounted on the wheel carrier via the wheel bearing. The bolt hole circle consists of a plurality of bores arranged along an imaginary circle, each of which serves to receive a fastening means with the aid of which the automobile rim is fastened to the wheel hub. The fastener is, for example, in the form of a screw, bolt or the like.

The rim well and the hub are connected via the rim center. The rim center is therefore located between the rim well and the hub, viewed in the radial direction relative to the longitudinal center axis. Seen in the radial direction, it extends from the hub to the rim well. For example, the rim center has several spokes which are arranged or formed at a distance from one another in the circumferential direction. However, the rim center can also be continuous in the circumferential direction, in particular completely.

The rim center preferably engages off-center on the rim well in the axial direction or as seen in longitudinal section. This means that it merges into the rim well in the axial direction away from a center point of the rim well. The rim center preferably engages the rim well in the axial direction at a distance from the rim center bed that is at least 10%, at least 20%, at least 30%, at least 40% or more relative to a total extension of the rim well in the axial direction. For example, the rim center merges into the rim well at the end of the rim well as seen in the axial direction. In this case, viewed in longitudinal section, the rim center opens into the rim well in overlap with the outer flange or the inner flange, preferably the former. Due to the off-center rim center engaging the rim well, after mounting of the wheel on the automobile not only a force acts on the rim center in the radial direction, but also a bending moment in the axial direction or in an imaginary plane accommodating the longitudinal center axis of the automobile rim. Up to now, this has made it necessary to make the rim center correspondingly solid, using a large amount of material. However, the rim center can of course also engage centrally with the rim well and/or the hub.

Seen in longitudinal section, the rim well preferably has a greater axial extent than the rim center and the hub. In particular, the axial extent of the rim well is greater than the axial extent of the hub, which in turn is greater than the axial extent of the rim center. For example, the axial extension of the hub relative to the axial extension of the rim well is at most 50%, at most 40%, at most 30%, at most 25% or at most 20%. For example, the axial extension of the rim center, relative to the axial extension of the rim well, is at most 25%, at most 20%, at most 15%, at most 10% or at most 5%. The aforementioned dimensions create a receptacle, encompassed by the rim well, for the wheel hub and/or a brake disc fastened to the wheel, the wheel hub and/or the brake disc being present in this receptacle after the wheel has been mounted on the automobile.

The automobile rim is made continuously and uniformly of the casting material, namely aluminum or—preferably—aluminum alloy. This is processed by die casting. In the die casting process, the casting mold is used to form the automobile rim and thus at least the rim well together with the outer flange and inner flange, the rim center and the hub. The center recess, which can also be referred to as the wheel hub receptacle, is also preferably formed at least in part during the die casting process.

Die casting can be performed at normal pressure or in the presence of negative pressure in the form of vacuum die casting. Vacuum pressure die casting is characterized by the fact that the casting mold is at least in part evacuated before and/or during the introduction of the casting material into the casting mold. This means that the casting mold is subjected to a vacuum before and/or during the introduction of the casting material. In this context, the negative pressure is understood to mean a pressure which is lower than an injection pressure at which the casting material is introduced into the casting mold and/or an ambient pressure in an external environment of the casting mold. For example, the negative pressure relative to the external pressure is at most 50%, at most 25%, at most 10% or at most 5%. For example, the residual pressure is between 50 mbar and 200 mbar. The residual pressure is to be understood as the absolute pressure in the casting mold.

The casting mold is evacuated, for example, by means of a vacuum source which is placed in flow connection with the casting mold for this purpose. In particular, the casting mold is evacuated before the casting material is introduced. For example, the casting material is introduced when, in particular only when, a certain vacuum or residual pressure is reached in the casting mold. It may additionally or alternatively be provided to evacuate the casting mold during the introduction of the casting material, i.e., to maintain the flow connection between the vacuum source and the casting mold during the introduction of the casting material into the casting mold and to continue to operate the vacuum source for evacuating the casting mold. This allows particularly filigree structures of the automobile rim to be produced.

It is provided, for example, that the casting mold is first sealed by means of at least one seal, for example by means of a sealing cord, in particular a silicone sealing cord. The casting material is then metered into a casting chamber which is fluidically connected to the casting mold. For this purpose, the casting chamber is at least temporarily fluidically connected to a crucible in which the molten casting material is stored. The casting mold is then subjected to the vacuum and the casting material in the casting chamber is forced into the casting mold, in particular by means of a pressurized piston. The flow connection between the casting chamber and the crucible preferably exists simultaneously, in particular continues. This means that the evacuation of the casting chamber also takes place during the introduction of the casting material.

During driving operation of the automobile, heat can be introduced into the automobile rim and/or at least one further element of the automobile. The further element is, for example, a brake disc, a wheel carrier or the like. In order to dissipate at least the heat from the automobile rim, the automobile rim has the at least one air conveying element and/or the at least one surface enlargement element. Here, exactly one air conveying element or several air conveying elements may be implemented. Additionally or alternatively, exactly one surface enlargement element or a plurality of surface enlargement elements may be formed on the automobile rim. Insofar as the air conveying element is referred to in the context of this description, the embodiments are always applicable to the at least one air conveying element or each of the plurality of air conveying elements. The same applies to embodiments concerning the surface enlargement element, which are likewise always applicable to the at least one surface enlargement element or each of the plurality of surface enlargement elements.

It may be provided that only the at least one air conveying element, but not the surface enlargement element, is implemented on the automobile rim. Conversely, it can of course be provided that the surface enlargement element is present on the automobile rim, but not the air conveying element.

Particularly advantageously, however, both the air conveying element and the surface enlargement element are formed on the automobile rim. Insofar as the air conveying element and the surface enlargement element are mentioned in the context of this description, the explanations are always applicable to the respective one of the present elements. The common mention of the air conveying element and the surface enlargement element therefore does not mean that both elements are actually present, although this can of course be the case.

The air conveying element and the surface enlargement element are formed in one piece and continuously with the automobile rim. They are formed together with the automobile rim during die casting. It is therefore not intended to produce the air conveying element and the surface enlargement element independently of the automobile rim and subsequently to attach them to the latter. This makes for particularly efficient production of the automobile rim.

The air conveying element is designed in such a way that it exerts a conveying effect on the air surrounding the automobile rim during a rotational movement of the automobile rim about its longitudinal center axis. During the rotational movement of the automobile rim, the air conveying element conveys the air in the axial direction relative to the longitudinal center axis, for example from an inner side of the rim of the automobile rim in the direction of an outer side of the rim or vice versa. With the aid of the air conveying element, during driving operation of the automobile, i.e., the rotary movement of the automobile rim, an air flow is to be effected in the axial direction, which brings about efficient cooling of the automobile rim and/or the at least one further element. For example, warm air can be removed from the further element by means of the air conveying element, in particular by conveying the warm air present on the inner side of the rim in the direction of the outer side of the rim or removing it to the outer side of the rim. The inner side of the rim is to be understood in particular as a side of the automobile rim facing the wheel carrier, whereas the outer side of the rim is the side of the automobile rim facing away from the wheel carrier.

The other element, for example the brake disc, is usually located on the inside of the rim, for example it is at least in some areas surrounded by the rim well so that it is ultimately arranged in the automobile rim. After the automobile rim has been mounted on the automobile, the further element is preferably connected to the automobile rim in a rotationally fixed manner. The air conveying effect of the air conveying element is achieved by adjusting the air conveying element with respect to the imaginary plane, the plane being perpendicular to the longitudinal center axis of the automobile rim. In principle, the air conveying element can be plate-shaped when viewed in cross-section and exhibit the air conveying effect solely as a result of its adjustment. However, it is also possible for the air conveying element to be airfoil-shaped when viewed in cross-section, i.e., to be present as a fluidic profile. With such a design of the air conveying element, a particularly efficient and effective conveying of the air is achieved.

In addition or alternatively to the at least one air conveying element, the automobile rim has the at least one surface enlargement element. The surface enlargement element also ultimately serves to dissipate heat. This is achieved by enlarging the surface area of the automobile rim so that heat is dissipated from or removed from the automobile rim via the surface enlargement element due to natural convention and/or forced convection. The surface enlargement element extends in the circumferential direction along the imaginary circular line, so that the surface enlargement element is annular at least in some areas, in particular only in some areas or continuously. The surface enlargement element encompasses the longitudinal center axis of the automobile rim at least partially, for example thus only partially or completely. In particular, the surface enlargement element extends in the circumferential direction over at least 30°, at least 60°, at least 90° or at least 180°.

A particularly preferred embodiment of the automobile rim is of course one in which the at least one surface enlargement element is present in addition to the at least one air conveying element. In such a design, the air conveying element and the surface enlargement element are preferably arranged and designed in such a way that the air flow caused by the air conveying element during the rotational movement of the automobile rim flows against and/or over the surface enlargement element. Such a design of the automobile rim enables the heat to be dissipated particularly effectively. For example, the surface enlargement element and the air conveying element are also connected with one another or fastened with one another.

The procedure described for the production of the automobile rim enables simple, fast and inexpensive formation of the automobile rim, which at the same time can have an extremely filigree structure and is also intended and designed for effective heat dissipation. The rapid production is achieved in particular by die casting, in which the mold is filled much more quickly than in permanent mold casting or low-die casting, which is normally used to produce automobile rims. Overall, therefore, die casting allows the cycle time for producing the automobile rim to be significantly increased, so that a larger number of automobile rims can be produced in the same period of time. The solidification time for die casting is also significantly shorter than for permanent mold casting.

In a development of the invention, the automobile rim has, at least in some areas, a low wall thickness of at most 15 mm and/or has a curvature with a small radius of curvature of at most 4 mm and/or has a demolding surface extending in the axial direction and in the radial direction and/or in the axial direction and in the tangential direction with respect to a longitudinal center axis of the automobile rim, which demolding surface lies completely in an imaginary plane, the plane enclosing an angle with the longitudinal center axis which is more than 0° and at most 4°. This preferably applies to the air conveying element and/or the surface enlargement element. It may thus be provided that the air conveying element and/or the surface enlargement element have the low wall thickness and/or the curvature with the small radius of curvature, and/or that the demolding surface is formed thereon.

The automobile rim produced by means of die casting is characterized in principle by a particularly low wall thickness and/or a curvature with a particularly small radius of curvature and/or by the presence of the demolding surface. The wall thickness is to be understood as the thickness of the wall of the automobile rim at at least one point. The low wall thickness can thus be present, for example, at the rim well, the outer flange, the inner flange, the rim center and/or the hub. The low wall thickness is particularly preferably present at the rim center. The low wall thickness very preferably represents the greatest wall thickness, for example the greatest wall thickness of the outer flange, the greatest wall thickness of the inner flange and/or the greatest wall thickness of the rim center. Of course, it can also be the largest wall thickness of the rim well and/or hub.

The low wall thickness is at most 15 mm, at most 10 mm, at most 7.5 mm or at most 5 mm, but is preferably smaller. Thus, for example, it is at most 4 mm, at most 3 mm, at most 2 mm or at most 1.5 mm Conversely, the low wall thickness is particularly preferably at least 1.5 mm or at least 2 mm. In other words, the low wall thickness is, for example, at least 1.5 mm and at most 5 mm, at least 1.5 mm and at most 4 mm, at least 1.5 mm and at most 3 mm, at least 1.5 mm and at most 2 mm, or approximately or exactly 1.5 mm. However, it may also be at least 2 mm and at most 5 mm, at least 2 mm and at most 4 mm, at least 2 mm and at most 3 mm, or exactly 2 mm.

In addition or alternatively to the low wall thickness, the curvature with the small radius of curvature is present. The curvature is a curvature of an outer surface or an outer circumferential surface of the automobile rim. The outer surface bounds a wall of the automobile rim outwardly. The curvature can be present at any point of the automobile rim, for example at the rim well, the outer flange, the inner flange, the rim center and/or the hub. The curvature is in particular a transition curvature between two surfaces which—seen in section—are angled towards each other and are present, for example, as flat surfaces.

The curvature preferably extends over an angle of at least 30°, at least 45°, at least 60° or at least 90°. The curvature has the small radius of curvature, which is at most 4 mm, but is preferably smaller. For example, the small radius of curvature in this respect thus corresponds, for example, to a radius of curvature of at most 3 mm, at most 2 mm, at most 1.5 mm or at most 1 mm Conversely, the radius of curvature may additionally be at least 0.25 mm, at least 0.5 mm, or at least 0.75 mm.

In addition or alternatively to the low wall thickness and/or the curvature with the low radius of curvature, the automobile rim may have the demolding surface. The demolding surface is to be understood as a flat surface which directly abuts the casting mold during die casting and along which demolding of the automobile rim from the casting mold takes place after die casting. The demolding surface has an extension at least in the axial direction and in the radial direction and/or—additionally or alternatively—in the axial direction and in the tangential direction, in each case with respect to the longitudinal center axis of the automobile rim. In any case, the demolding surface thus has an extension in two directions perpendicular with one another and to this extent lies completely in the imaginary plane.

Demolding of the automobile rim takes place in the same direction. For example, after die casting, part of the casting mold is displaced in the direction of the longitudinal center axis, i.e., in the axial direction, to open the casting mold and remove the automobile rim from the casting mold. This means that a casting mold surface of the casting mold abutting and forming the demolding surface during die casting is displaced along the longitudinal center axis after die casting. In a conventional method for producing an automobile rim, a demolding angle, i.e., an angle present between the demolding surface and the longitudinal center axis, must be at least 5° to ensure proper demolding.

Due to the integral and continuous formation of the automobile rim by die casting from aluminum or the aluminum alloy, a significantly smaller angle can, however, be realized. The angle between the demolding surface or between the plane completely accommodating the demolding surface and the longitudinal center axis is thus between infinitesimally more than 0° and 4°, including these values in each case. It can thus be provided that the demolding surface extends almost parallel to the longitudinal center axis, so that an almost parallel displacement of the mold surface and the demolding surface occurs during demolding. By the angle of 0° it is to be understood that the plane and the longitudinal center axis lie in one another or run parallel with one another. For example, the angle is at least 0.5°, at least 1° or at least 1.5°. At most, however, an angle of 4° is provided. For example, the angle is at most 3°, at most 2.0°, at most 1.5°, at most 1.0°, or at most 0.5°. Preferred here are the smaller angles of at most 2.0° and less.

The air conveying element and/or the surface enlargement element are preferably provided with the low wall thickness and/or the curvature with the small radius of curvature and/or the demolding surface. However, it is particularly preferred that the air conveying element and the surface enlargement element are formed at least with the low wall thickness, which is particularly preferred to be at most 7.5 mm, at most 5 mm or at most 2.5 mm With such a design of the automobile rim, the described cooling effect can be achieved while at the same time keeping the weight of the automobile rim low.

In a further development of the invention, the air conveying element extends from the hub to the rim well and is produced with a load capacity in the radial direction equal to at least 2.5%, at least 5%, at least 7.5% or at least 10% of the load capacity of the rim center in the radial direction. The load capacity is understood to be the load capacity in the radial direction between the hub and the rim well. The air conveying element extends in this respect in the radial direction from the hub to the rim well. The load capacity of the air conveying element should be smaller than the load capacity of the rim center. At least, however, the load capacity corresponds to one of the values mentioned.

The load capacity of the rim center is understood here to mean the load capacity of the entire rim center, regardless of whether it is continuous or has several spokes. If several spokes are assigned to the rim center, the air conveying element has, for example, a load capacity in the radial direction that corresponds to at least 25%, at least 50% or at least 75% of the load capacity of one of the spokes. However, in addition or alternatively, the load capacity of the air conveying element is at most 75%, at most 50%, or at most 25% of the load capacity of one of the spokes. For example, the load capacity of the air conveying element is thus at least 25% and at most 75%, at least 25% and at most 50%, or exactly or approximately 25% of the load capacity of one of the spokes.

For example, at least one air conveying element, in particular exactly one air conveying element, is assigned to each of the multiple spokes. The respective air conveying element is preferably arranged on the corresponding spoke. The air conveying element preferably starts from the respective spoke and is continuously connected to the spoke in the radial direction from the inside to the outside. In this respect, for example, the number of air conveying elements corresponds to the number of spokes. However, it may also be provided that the number of air conveying elements is larger or smaller than the number of spokes. For example, only every second, every third or every fourth of the spokes is assigned an air conveying element. Conversely, each of the spokes can also be assigned a number of air conveying elements, which are arranged on the respective spoke at a distance from one another, in particular in the circumferential direction. In this way, a particularly effective heat input can be achieved.

In a further development of the invention, the rim center is formed with a plurality of spokes spaced apart from each other in a circumferential direction with respect to a longitudinal center axis of the automobile rim. Such a design of the rim center is used in particular to reduce the weight of the automobile rim, but also to achieve better damping. In this respect, the rim center is not solid and continuous in the circumferential direction, but is composed of the plurality of spokes spaced from each other in the circumferential direction. Each of the plurality of spokes preferably extends from the hub in the radial direction to the rim well, thus connecting the hub and the rim well together. For example, at least three spokes, at least four spokes, at least five spokes, or at least six spokes are provided. For example, at least 10, at least 14 or at least 18 spokes are realized. At most 30 spokes or at most 20 spokes are preferably present. For example, each of the spokes extends in the circumferential direction over at most 30° or less, preferably at most 15° or at most 10°.

It may be provided that the spokes have a constant extension in the circumferential direction, i.e., starting from the rim well up to the hub. However, a branching of at least one of the spokes or of several or each of the spokes may also be provided, so that the respective spoke is divided into several partial spokes. For example, the spoke initially extends radially outwards from the hub and at a division point splits into a plurality of partial spokes which extend away from one another, in particular in the circumferential direction. After the division point, the partial spokes extend at a distance from one another as far as the rim well and engage the latter at a distance from one another. It may be provided that a longitudinal center axis of at least one of the spokes, in particular the longitudinal center axis of several or all spokes, intersect the longitudinal center axis of the automobile rim or are even perpendicular to it. This achieves a particularly optimum introduction of force from the rim center or from the spokes into the hub.

In a further development of the invention, the automobile rim is produced in some areas with a first wall thickness of more than 15 mm, in particular at least 17.5 mm or at least 20 mm, and in some areas with a second wall thickness corresponding to the low wall thickness. For example, it is provided that the automobile rim is produced in some areas with a first wall thickness of more than 5 mm, in particular at least 7.5 mm or at least 10 mm, but at most 20 mm, and in some areas with a second wall thickness corresponding to the low wall thickness. The second wall thickness is preferably at least 1.5 mm or at least 2 mm and at most 15 mm, at most 10 mm, at most 7.5 mm or at most 5 mm, preferably at most 3 mm, at most 2.5 mm or at most 2 mm. The automobile rim thus does not have the continuous low wall thickness, but is composed of several parts, some of which have the first wall thickness and others of which have the second wall thickness. Here, the first wall thickness is generally greater than the second wall thickness, for example by a factor of at least 1.5, at least 2.0 or at least 2.5. For example, the first wall thickness and the second wall thickness are both implemented in the rim center. Thus, in particular, each of the spokes—if present—may have partly the first wall thickness and partly the second wall thickness. In this way, a particularly high load capacity of the automobile rim is achieved with a simultaneously extremely filigree design.

In a further development of the invention, the low wall thickness is used in a region lying in the circumferential direction between two spokes, so that the two spokes are connected with one another via an intermediate spoke element produced during the die casting process, which has the low wall thickness at least in some areas, in particular continuously. The region lying between the two spokes in the circumferential direction can also be referred to as the intermediate spoke region.

The intermediate spoke region extends in the circumferential direction between the two spokes and is bounded in the radially inward direction by the hub and in the radially outward direction by the rim well. To this extent, the intermediate spoke region is present edge-to-edge on the automobile rim. The intermediate spoke area is now at least in part or even completely provided with the intermediate spoke element, so that the area between the two spokes is at least in part or even completely closed with the intermediate spoke element. In this case, the intermediate spoke element has the low wall thickness. The two spokes, on the other hand, can have a greater wall thickness than the low wall thickness, for example a wall thickness corresponding to the first wall thickness. However, it is of course also possible for the two spokes to be designed with the low wall thickness. In this case, the low wall thickness is also used—in particular continuously—for the intermediate spoke element, or a wall thickness that is smaller than the low wall thickness is used. With the aid of the intermediate spoke element, excellent aerodynamic properties are achieved for the automobile rim.

In a further development of the invention, the intermediate spoke element is formed to completely fill an area bounded circumferentially by the two spokes, radially inwardly by the hub, and radially outwardly by the rim well. Such a design has already been referred to above. The intermediate spoke element therefore completely fills the intermediate spoke area or closes it continuously. As a result, particularly good aerodynamic properties are realized.

In a further development of the invention, the air conveying element and/or the surface enlargement element are formed starting from the rim center, in particular from the at least one spoke. The air conveying element or the surface enlargement element preferably extends away from the rim center in the axial direction so that it has a free end on its side facing away from the rim center. In the case of the air conveying element, the free end can be in the form of a straight line or curved, in particular with a constant or changing curvature in the radial direction from the inside to the outside or vice versa. The free end of the surface enlargement element is preferably circular or at least in part circular. In this respect, the surface enlargement element is preferably in the form of a hollow cylinder, in particular a hollow circular cylinder.

If the rim center has the plurality of spokes, the at least one air conveying element is preferably attached to at least one of the spokes. It has already been pointed out that the plurality of spokes may also have a plurality of air conveying elements associated therewith. In the case of the plurality of spokes, the surface enlargement element preferably connects a plurality of spokes to each other, thus engaging a plurality of the spokes, in particular all of the spokes. In the latter case, it is preferably designed continuously in the circumferential direction, i.e., it completely engages around the longitudinal center axis of the automobile rim. The described embodiment enables a particularly high cooling effect of the automobile rim.

In a further embodiment of the invention, the air conveying element and/or the surface enlargement element are formed on the inside of the automobile rim. In other words, the air conveying element and/or the surface enlargement element extend in the axial direction, i.e., as viewed in longitudinal section, in the direction of the inner flange. As a result, the air conveying element and the surface enlargement element are preferably also completely accommodated in the automobile rim, as viewed in longitudinal section. Ideally, the air conveying element and/or the surface enlargement element are arranged in such a way that they are not visible or only barely visible from the outside of the rim when viewed normally. This provides an excellent visual impression of the automobile rim despite the air conveying element and/or the surface enlargement element.

In a further development of the invention, the surface enlargement element is formed starting from the air conveying element. Thus, the surface enlargement element extends circumferentially from the air conveying element. For example, it again extends to the air conveying element so that the surface enlargement element engages the air conveying element on both sides. However, it may also be provided that the surface enlargement element extends from one of a plurality of air conveying elements to another of the plurality of air conveying elements. In this way, a particularly low wall thickness of the air conveying element can be realized because it is supported by the surface enlargement element.

In a further development of the invention, the air conveying element is formed extending in the radial direction relative to the longitudinal center axis from the hub to the rim well. This has already been referred to above.

In a further development of the invention, the air conveying element, viewed in longitudinal section, is formed with a maximum extension in the axial direction equal to an extension of the rim center of the same direction or is larger than this by at most 50%, at most 40%, at most 30%, at most 20% or at most 10%. Conversely, when viewed in longitudinal section, the air conveying element has, for example, an extension in the axial direction that corresponds to at least 50%, at least 75%, or at least 100% of the extension of the rim center in that direction. Such a design ensures an excellent visual impression of the automobile rim while at the same time providing a high load capacity.

In a further development of the invention, the casting mold used in the die casting is part of a die casting mold, in particular a two-plate die casting mold or a three-plate die casting mold, and the casting material is introduced into the casting mold through at least one injection opening, in particular through a plurality of injection openings. The three-plate die casting mold is characterized in that its gating system is in a different plane than the injection opening. The three-plate die casting mold has three plates, namely a first plate, a second plate, and a third plate. Between the first plate and the second plate, there is preferably at least one sprue channel through which the injection opening is fluidly connected to an inlet opening.

Through the inlet opening, the casting material is supplied to the casting mold. In contrast, the automobile rim is formed between the second plate and the third plate. That is, the second plate and the third plate form the actual casting mold. The at least one runner and the automobile rim to be produced are present on opposite sides of the second plate. The casting material is preferably introduced into the casting mold through a plurality of injection openings. The plurality of injection openings is preferably fluidically connected to the inlet opening via the sprue channel or via a plurality of sprue channels, respectively. The use of the two-plate die casting mold or the three-plate die casting mold enables a particularly simple and rapid production of the automobile rim.

In a further development of the invention, the automobile rim is made of AlSi10MnMgZn. In this respect, this aluminum alloy serves as the casting material. The aluminum alloy exhibits excellent strength properties for the automobile rim. For example, an AlSi alloy containing the following components is used as the casting material: 6.5 wt % to 12.0 wt % Si, a maximum of 0.8 wt % Mn, 0.25 wt % to 0.6 wt % Mg, 0.08 wt % to 0.5 wt % Zn, a maximum of 0.3 wt % Zr, a maximum of 0.025 wt % Sr, a maximum of 0.5 wt % impurities, and the balance Al. The alloy may have at least one of the following optional governing ingredients: maximum 0.2 wt % V, maximum 0.2 wt % Mo, maximum 0.3 wt % Sn, maximum 0.3 wt % Co, and maximum 0.2 wt % Ti.

Such an alloy is particularly suitable for the production of the automobile rim because it allows the realization of particularly filigree structures. The proportion of Mn is preferably greater than 0 wt. %, for example it is 0.2 wt. % or 0.3 wt. % on the one hand to 0.8 wt. % on the other. For example, the proportion of Mg is at most 0.5 wt %. The proportion of Zn is preferably at most 0.35 wt %. The proportion of Sr is further preferably greater than 0 wt. %, in particular it is 0.006 wt. % to 0.025 wt. %. The aluminum alloy particularly preferably contains Cr, namely at most 0.3 wt %. The impurities are to be understood as at least one element of the periodic table which is present in the alloy without deliberate addition. The impurities may, of course, also contain several of these elements.

In a further development of the invention, the automobile rim is heat treated after die casting. The heat treatment is, for example, an annealing of the automobile rim. The annealing comprises at least heating the automobile rim to a certain temperature, which may also be referred to as the holding temperature, holding the automobile rim at the holding temperature, and subsequently cooling it from the holding temperature, in particular to a temperature of at most 200° C. or to an ambient temperature.

It may be provided that the heat treatment is performed for the entire automobile rim. However, it can also be carried out only locally, so that heat is introduced into the automobile rim only locally and a higher temperature occurs correspondingly at the heat-treated location than at other locations of the automobile rim at which the heat treatment is not carried out.

The heat treatment may additionally or alternatively be carried out in a locally different manner By this is meant that a first area of the automobile rim is subjected to a first heat treatment and a second area of the automobile rim is subjected to a second heat treatment different from the first heat treatment, wherein, for example, a first holding temperature is used in the first heat treatment and a second holding temperature is used in the second heat treatment, which is different from the first holding temperature.

The invention further relates to an automobile rim made of aluminum or an aluminum alloy for a wheel of an automobile, in particular produced according to the embodiments within the scope of this description, wherein the automobile rim has a rim well delimited on opposite sides by an outer flange and an inner flange, a hub with a center recess and a bolt hole circle, and a rim center connecting the rim well and the hub with one another, in particular engaging eccentrically on the rim well in longitudinal section.

It is provided here that the automobile rim is produced in one piece and continuously in a casting mold by die casting of a casting material, wherein the automobile rim has at least one air conveying element for conveying air in the axial direction with respect to a longitudinal center axis of the automobile rim relative to an imaginary plane perpendicular to the longitudinal center axis and/or at least one surface enlargement element extending in the circumferential direction along a circular line, which is formed during the die casting.

The advantages of such a design of the automobile rim or such a procedure for its production have already been pointed out above. Both the automobile rim and the method for its production can be further embodied in accordance with the explanations within the scope of this description, so that reference is made to the latter in this respect.

BRIEF DESCRIPTION OF THE FIGURE(S)

The invention will be explained in more detail below with reference to the exemplary embodiments shown in the drawing, without any limitation of the invention. In the drawings.

DETAILED DESCRIPTION

Figure 1:
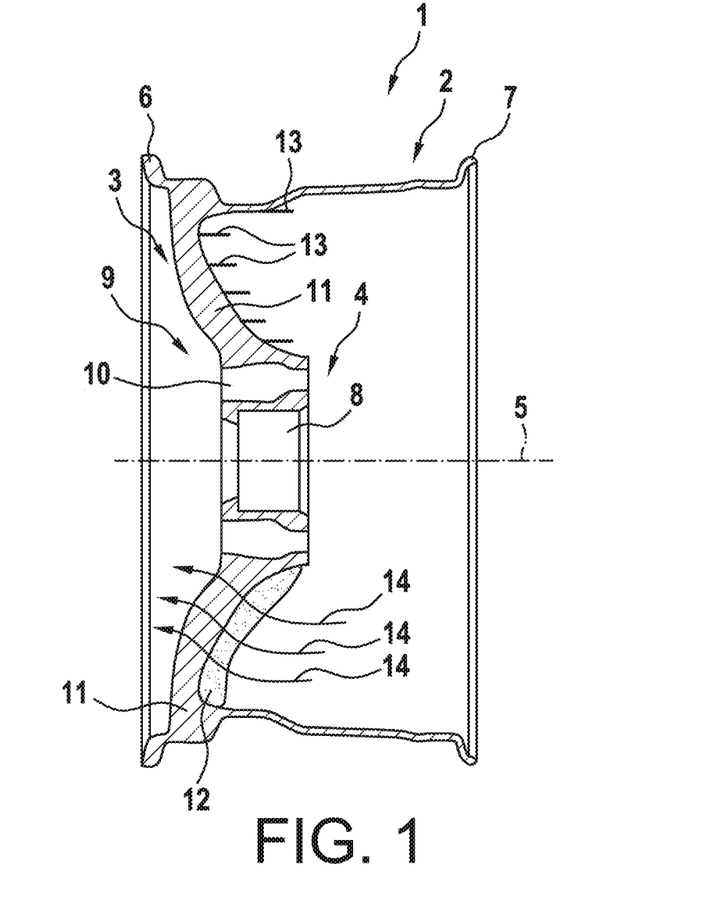
FIG. 1 shows a schematic longitudinal sectional view through an automobile rim for a wheel of an automobile.
Figure 2:
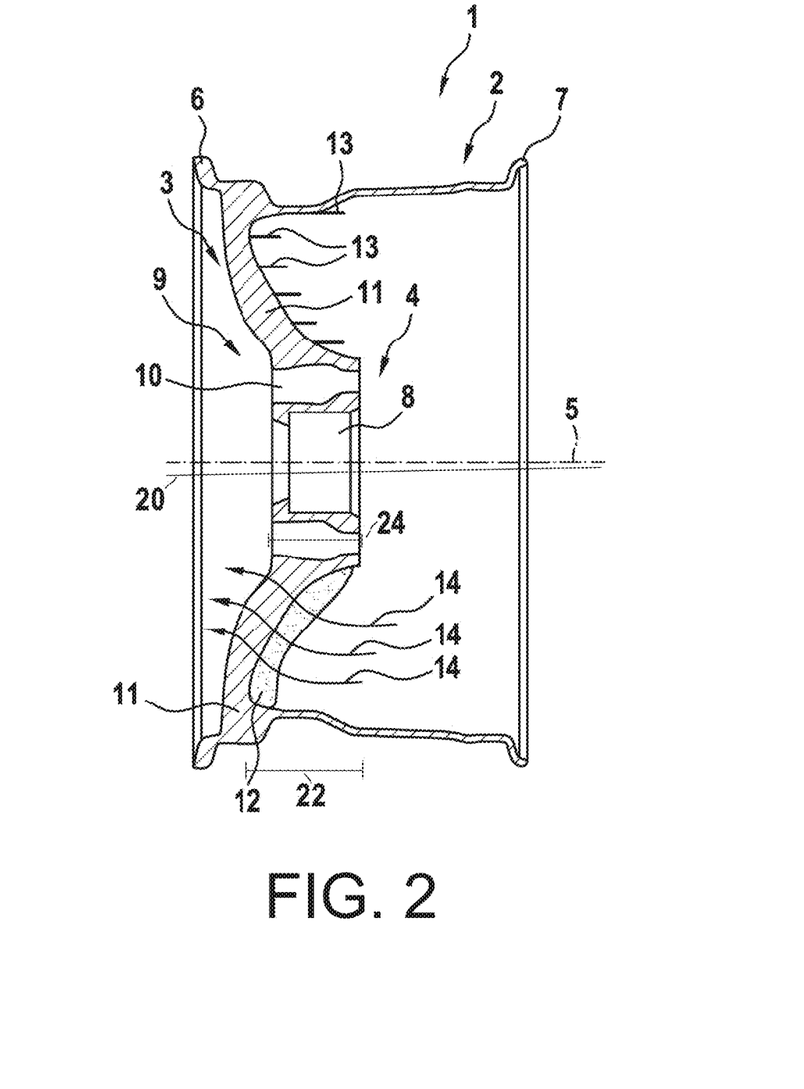
FIG. 2 shows a schematic longitudinal sectional view through an automobile rim for a wheel of an automobile having axial distances and an angle of orientation of a demolding surface shown thereon.

FIG. 1 shows a schematic longitudinal sectional view through an automobile rim 1 for a wheel of an automobile. The automobile rim 1 has as essential components a rim well 2, a rim center 3 and a hub 4. The automobile rim 1 is shown in longitudinal section with respect to a longitudinal center axis 5 of the automobile rim 1. The rim well 2 is bounded in the axial direction on the one hand by an outer flange 6 and on the other hand by an inner flange 7, which, starting from the rim well 2, extend outwards in the radial direction relative to the longitudinal center axis 5. It should also be noted that the axial extension of the rim well 2 extends to a respective outer end of the outer flange 6 and of the inner flange 7. Thus, the axial extension of the rim well 2 includes the axial extensions of the outer flange 6 and the inner flange 7. FIG. 2 shows a variation of FIG. 1 that depicts the line normal to the demolding surface, 20, which is 0 to 4 degrees from the center axis 5.

The rim well 2 and the hub 4 are connected to each other via the rim center 3. The rim center 3 thus engages both the rim well 2 and the hub 4 and extends from the hub 4 to the rim well 2. The hub 4 has a center recess 8 which is present centered on the hub 4 with respect to the longitudinal center axis 5 and extends completely through the hub 4 in the axial direction. In addition, the hub 4 has a bolt hole circle 9 with a plurality of holes 10, each of which serves to receive a fastening means by means of which the automobile rim 1 can be fastened or is fastened to a wheel hub of the automobile.

Figure 4:
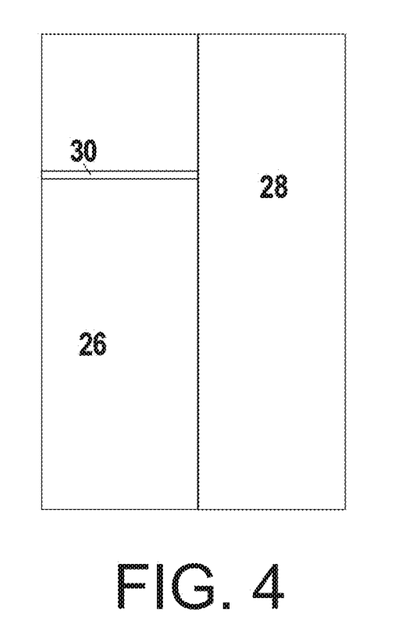
FIG. 4 shows a stylized schematic of an exemplary casting mold.

In the exemplary embodiment shown here, the rim center 3 has a plurality of spokes 11 which are arranged spaced apart from one another in the circumferential direction. Each of the spokes 11 extends from the hub 4 to the rim well 2 in the circumferential direction between the spokes 11 there is an intermediate spoke region which is bounded in the circumferential direction by the spokes 11, in the radially inward direction by the hub 4 and in the radially outward direction by the rim well 2. In this intermediate spoke region, an intermediate spoke element may be formed which completely fills the intermediate spoke region, for example. At least the intermediate spoke element 12 has a low wall thickness of at most 5 mm. In particular, to realize the same, the automobile rim 1 is in one piece and continuously produced in a casting mold by die casting a casting material, said mold taking a form such as is shown in FIG. 4, with a plurality of plates 26, 28 having at least one injection opening 30 defined therewithin or therebetween. The casting material used is aluminum or an aluminum alloy.

Figure 3:
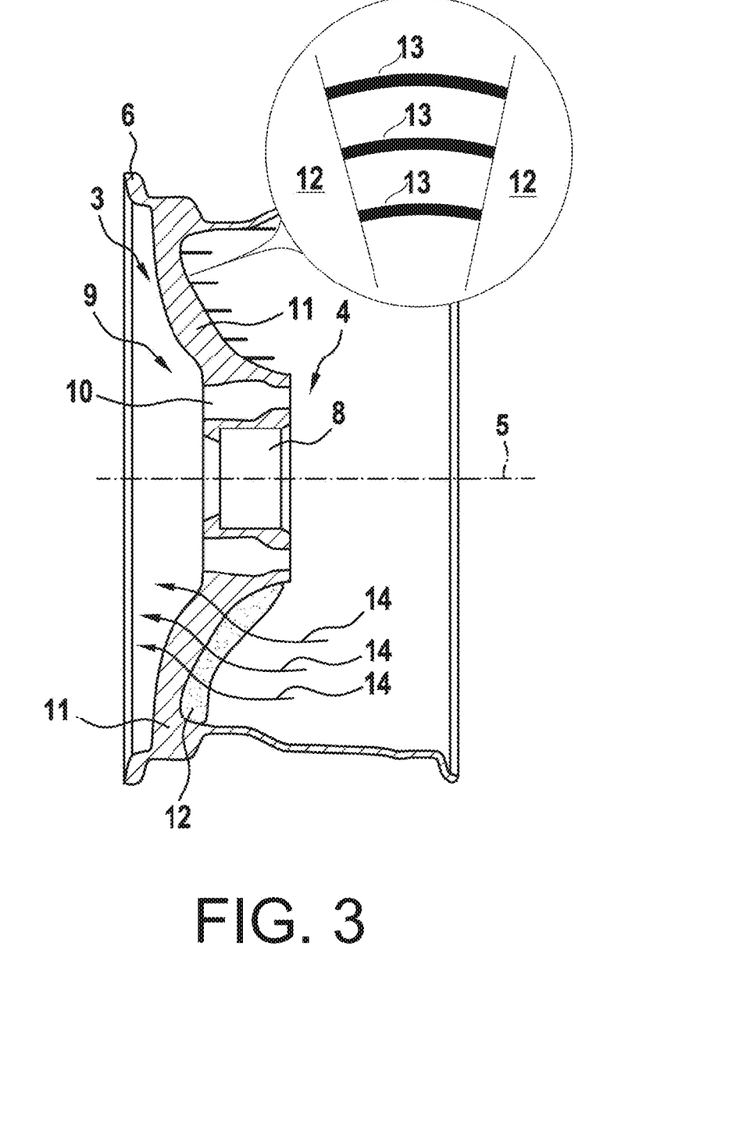
FIG. 3 shows a schematic longitudinal sectional view through an automobile rim for a wheel of an automobile having a detail view of multiple surface enlargement elements.

To ensure good cooling of the automobile rim 1, it has at least one air conveying element 12 (of which only one is shown by way of example) and at least one surface enlargement element 13. In the exemplary embodiment shown here, a plurality of surface enlargement elements 13 are implemented, of which only some are shown by way of example. FIG. 2 shows an axial extent of the at least one air conveying element 12 as distance measurement 22, shown together with an axial extent of the rim center as distance measurement 24. FIG. 3 provides a detail view of an exemplary embodiment of the plurality of surface enlargement elements 13 extending from the at least one air conveying element.

The air conveying element 12 serves to convey air in an axial direction relative to the longitudinal center axis 5. The direction of flow of the air, which is achieved during a rotational movement of the automobile rim 1 about the longitudinal center axis 5 by means of the air conveying element 12, is indicated by the arrows 14 by way of example. The air conveying element 12 extends from the spoke 11, preferably one such air conveying element 12 is associated with each of the spokes 11 (not shown). The air conveying element 12 is preferably designed with a low wall thickness of at most 15 mm, at most 10 mm, at most 7.5 mm, at most 5 mm or less. In particular, the air conveying element 12 has a wall thickness of at most 2.5 mm, at most 2 mm, at most 1.5 mm or at most 1 mm.

The surface enlargement element 13 extends starting from the spoke 11 or spokes 11 in the axial direction in the direction of the inner flange 7. If—as is the case here—a plurality of surface enlargement elements 13 are present, they are arranged spaced apart from one another in the radial direction. For example, starting from the rim center 3, they each have the same extension in the axial direction. They can be arranged offset from one another in the axial direction, for example due to an offset and/or a curvature of the rim center 3. The surface enlargement element 13 extends along a circular line in the circumferential direction. The surface enlargement element 13 is particularly preferably circular or annular overall. In this respect, it is in the form of a hollow circular cylinder, which is arranged with a first end face on the rim center 3 and has a free end on its second end face.

The described embodiment of the automobile rim 1 realizes an extremely filigree appearance and, at the same time, due to the producing of the automobile rim 1 by die casting, ensures a cost-effective and fast producing of the automobile rim 1. In addition, excellent strength values are achieved by means of the die casting of the aluminum or the aluminum alloy, and an effective dissipation of heat from the automobile rim 1 is ensured due to the air conveying element 12 and/or the surface enlargement element 13.

LIST OF REFERENCE NUMERALS 1 automobile rim
2 rim well
3 rim center
4 hub
5 longitudinal center axis
6 outer flange
7 inner flange
8 centerl recess
9 bolt hole circle
10 bore
11 spoke
12 air conveying element
13 surface enlargement element
14 arrow
20 normal of the demolding surface
22 axial extent of an air conveying element
24 axial extent of a rim center
26 first plate of a casting mold
28 second plate of a casting mold
30 injection opening of a casting mold

The invention claimed is:

1. A method for producing an automobile rim from aluminum or an aluminum alloy for a wheel of an automobile, wherein the automobile rim has a rim well delimited on opposite sides by an outer flange and an inner flange, a hub with a center recess and a bolt hole circle, and a rim center connecting the rim well and the hub with one another, wherein the automobile rim is produced in one piece and continuously in a casting mold by die casting of a casting material, the automobile rim being formed during die casting with at least one air-conveying element, which is installed with respect to an imaginary plane perpendicular to a longitudinal center axis of the automobile rim to convey air in an axial direction with respect to the longitudinal center axis of the automobile rim, and with at least one surface enlargement element extending in a circumferential direction along a circular line.

2. The method of claim 1, wherein the automobile rim:
has, at least in some areas, a lowest wall thickness of at most 15 mm, and/or
has a curvature with a smallest radius of curvature of at most 4 mm, and/or
has a demolding surface which extends in the axial and a radial direction and/or in the axial and a tangential direction relative to the longitudinal center axis of the automobile rim and which is situated completely in an imaginary plane, the plane enclosing an angle with the longitudinal center axis which is more than 0° and at most 4°.

3. The method of claim 2, wherein the rim center is formed with a plurality of spokes spaced apart in the circumferential direction relative to the longitudinal center axis of the automobile rim.

4. The method of claim 2, wherein the air-conveying element and/or the surface enlargement element are formed starting from the rim center.

5. The method of claim 2, wherein the air conveying element and/or the surface enlargement element are formed on an inside of the automobile rim.

6. The method of claim 2, wherein the surface enlargement element is formed starting from the air conveying element.

7. The method of claim 1, wherein the rim center is formed with a plurality of spokes spaced apart in the circumferential direction relative to the longitudinal center axis of the automobile rim.

8. The method of claim 7, wherein the air-conveying element and/or the surface enlargement element are formed starting from the rim center.

9. The method of claim 7, wherein the air conveying element and/or the surface enlargement element are formed on an inside of the automobile rim.

10. The method of claim 7, wherein the surface enlargement element is formed starting from the air conveying element.

11. The method of claim 1, wherein the air-conveying element and/or the surface enlargement element are formed starting from the rim center.

12. The method of claim 11, wherein the air conveying element and/or the surface enlargement element are formed on an inside of the automobile rim.

13. The method of claim 11, wherein the surface enlargement element is formed starting from the air conveying element.

14. The method of claim 1, wherein the air conveying element and/or the surface enlargement element are formed on an inside of the automobile rim.

15. The method of claim 14, wherein the surface enlargement element is formed starting from the air conveying element.

16. The method of claim 1, wherein the surface enlargement element is formed starting from the air conveying element.

17. The method of claim 1, wherein the air conveying element is formed extending in the radial direction relative to the longitudinal center axis from the hub to the rim well.

18. The method of claim 1, wherein the air conveying element, viewed in longitudinal section, is formed with a maximum extension in the axial direction equal to an extension of the rim center in the same direction or is at most 50% greater than the latter.

19. The method of claim 1, wherein the casting mold used in the die casting is part of a die casting tool and the casting material is introduced into the casting mold through at least one injection opening.

20. An automobile rim made of aluminum or an aluminum alloy for a wheel of an automobile, the automobile rim comprising: a rim well delimited on opposite sides by an outer flange and an inner flange, a hub with a center recess and a bolt hole circle, and a rim center connecting the rim well and the hub with one another, wherein the automobile rim is produced in one piece and continuously in a casting mold by die casting of a casting material, wherein the automobile rim has at least one air-conveying element which is installed with respect to an imaginary plane perpendicular to a longitudinal center axis of the automobile rim to convey air in an axial direction with respect to the longitudinal center axis of the automobile rim and at least one surface enlargement element which extends in a circumferential direction along a circular line and is formed during die casting.

* * * * *